US010069410B1

(12) United States Patent
Chang et al.

(10) Patent No.: US 10,069,410 B1
(45) Date of Patent: Sep. 4, 2018

(54) MULTI-LEVEL POWER-DOMAIN VOLTAGE REGULATION

(71) Applicant: NXP USA, INC., Austin, TX (US)

(72) Inventors: Yi Cheng Chang, Tempe, AZ (US); Miguel Mendez Villegas, Guadalajara (MX); Vikas Vijay, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/441,042

(22) Filed: Feb. 23, 2017

(51) Int. Cl.
*G05F 1/577* (2006.01)
*H02M 3/07* (2006.01)

(52) U.S. Cl.
CPC .................................... *H02M 3/07* (2013.01)

(58) Field of Classification Search
CPC ................................ G05F 1/577; G05F 1/585
See application file for complete search history.

(56) References Cited

U.S. PATENT DOCUMENTS 3,581,104 A * 5/1971 Thew ...................... G05F 1/585 307/15
5,973,484 A 10/1999 Cho
6,979,983 B2 12/2005 Yen et al.
7,329,968 B2 * 2/2008 Shepard .................... H02J 1/08 307/18
7,541,786 B2 6/2009 Yen
8,063,508 B2 11/2011 Grewing et al.
8,174,288 B2 5/2012 Dennard et al.
8,878,387 B1 11/2014 Wong et al.

* cited by examiner

*Primary Examiner* — Jeffrey Zweizig
(74) *Attorney, Agent, or Firm* — Daniel D. Hill

(57) ABSTRACT

An integrated circuit has at least two power domains. A first power domain has circuitry coupled between a first power supply terminal and a second power supply terminal. A second power domain has circuitry coupled between a third power supply terminal and a fourth power supply terminal. A complementary voltage regulator includes N-type and P-type voltage regulators. The N-type voltage regulator is coupled between the first and third power supply terminals and controls a first voltage level at the second power supply terminal. The P-type voltage regulator is coupled between the third and fourth power supply terminals and controls a second voltage level at the third power supply terminal. The N-type voltage regulator produces a mid-level supply voltage to the P-type regulator and a "ground" for the circuits in the first power domain. The P-type regulator circuit produces a "ground" for the N-type regulator and a mid-level supply voltage for the circuits in the second power-domain. Thus, a current consumed by the first power-domain is reused in the second power domain, thus enhancing power efficiency.

20 Claims, 3 Drawing Sheets

- PRIOR ART -

MULTI-LEVEL POWER-DOMAIN VOLTAGE REGULATION

BACKGROUND

Field

This disclosure relates generally to electronic circuits and more specifically to multi-level power-domain voltage regulation.

Related Art

Reducing power consumption in integrated circuits is very important, especially for battery powered circuits. In an integrated circuit, different circuit types have different power supply requirements. As an example, a prior art integrated circuit 10 is illustrated in FIG. 1. Integrated circuit 10 has a power domain 12 comprising analog circuitry, and a power domain 14 comprising a combination of analog circuitry and digital logic. The analog circuitry requires a regulated voltage source to operate properly, whereas the digital logic does not. Frequently, a voltage requirement for the circuitry is lower than the supply voltage provided to the integrated circuit. A linear regulator 16 is provided to receive an external supply voltage labeled VDD, and to supply a lower, relatively constant, regulated voltage labeled VDD_REG to both power domains. In FIG. 1, the difference between power supply voltage VDD and the regulated voltage VDD_REG is graphically illustrated using ΔV. Power is wasted in the arrangement illustrated in FIG. 1 by the voltage difference (ΔV) between the higher power supply voltage and the lower power supply voltage multiplied by a voltage regulator output current from regulator 16.

Therefore, a need exists for an integrated circuit that reduces the wasted power and provides more efficient power supply usage.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
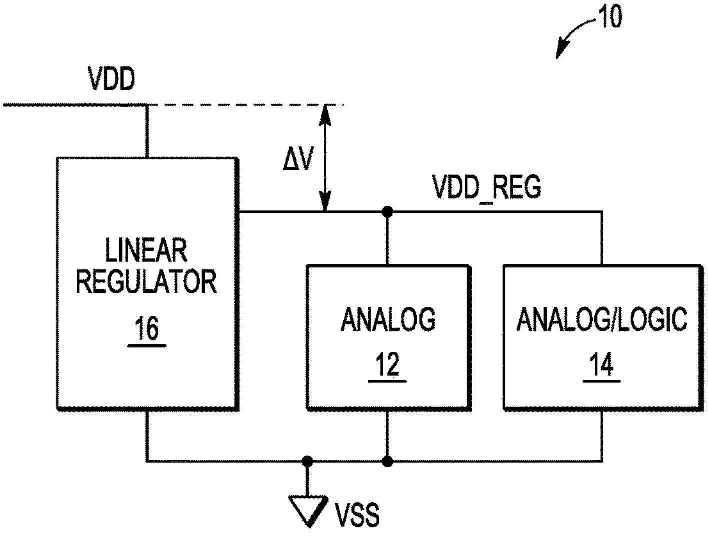
FIG. 1 illustrates, in block diagram form, a prior art integrated circuit.

Generally, there is provided, an integrated circuit having at least two power domains. A first power domain has electrical circuitry coupled between a first power supply terminal and a second power supply terminal. A second power domain has electrical circuitry coupled between a third power supply terminal and a fourth power supply terminal. A complementary voltage regulator includes an N-type voltage regulator and a P-type voltage regulator. The N-type voltage regulator is coupled between the first and third power supply terminals. The N-type voltage regulator controls a first voltage level at the second power supply terminal. The P-type voltage regulator is coupled between the third and fourth power supply terminals. The P-type voltage regulator controls a second voltage level at the third power supply terminal. The N-type voltage regulator produces a local mid-level supply voltage to the P-type regulator and a local "ground" for the circuits in the first power domain. The P-type regulator circuit produces a local "ground" for the N-type regulator and a local mid-level supply voltage for the circuits in the second power-domain. The current consumed by the first power-domain is shared, or re-used, in the second power domain, thus enhancing power efficiency.

In one embodiment, there is provided, an integrated circuit comprising: first and second power domains each comprising at least one electrical circuit, and wherein the first power domain is coupled between first and second power supply nodes and the second power domain is coupled between third and fourth power supply nodes; an N-type voltage regulator coupled between the first and third power supply nodes, wherein the N-type voltage regulator controls a first voltage level at the second power supply node; and a P-type voltage regulator coupled between the second and fourth power supply nodes, wherein the P-type voltage regulator controls a second voltage level at the third power supply node. The first power supply node receives a power supply voltage and the fourth power supply node is coupled to ground. The integrated circuit may further comprise an N-channel transistor having a first current electrode coupled to the second power supply node, a control electrode, and a second current electrode coupled to the third power supply node; and a P-channel transistor having a first current electrode coupled to the second power supply node, a control electrode, and a second current electrode coupled to the third power supply node. The N-type voltage regulator comprises: a voltage divider having a first terminal coupled to the first power supply voltage node, a second terminal, and a third terminal coupled to the first current electrode of the N-channel transistor; and an amplifier having a first input terminal coupled to the second terminal of the voltage divider, a second input terminal for receiving a first reference voltage, and an output terminal coupled to the control electrode of the N-channel transistor. The P-type voltage regulator may comprise: a voltage divider having a first terminal coupled to the fourth power supply node, a second terminal, and a third terminal coupled to the second current electrode of the P-channel transistor; and an amplifier having a first input terminal coupled to the second terminal of the voltage divider, a second input terminal for receiving a second reference voltage, and an output terminal coupled to the control electrode of the P-channel transistor. The integrated circuit may further comprise: a first stability compensation circuit having a first terminal coupled to the control electrode of the N-channel transistor, and a second terminal coupled to the fourth power supply node; and a second stability compensation circuit having a first terminal coupled to the control electrode of the P-channel transistor, and a second terminal coupled to the fourth power supply node. The integrated circuit may further comprise: a first stability compensation circuit coupled between the first power supply node and the second power supply node; and a second stability compensation circuit coupled between the third power supply node and the fourth power supply node. The first stability compensation circuit may comprise a first capacitor selectively coupled between to the first and second power supply nodes and wherein the second stability compensation circuit comprises a second capacitor selectively coupled between to the third and fourth power supply nodes The first and second stability compensation circuits may each comprise: at least one capacitor; and at least one switch for selectively coupling the at least one capacitor between corresponding ones of the first and second power supply nodes and the third and fourth power supply nodes.

In another embodiment, there is provided, an integrated circuit comprising: a first power domain comprising first electrical circuitry, the first electrical circuitry coupled to a first power supply terminal and a second power supply terminal; a second power domain comprising second electrical circuitry, the second electrical circuitry coupled to a third power supply terminal and a fourth power supply terminal; an N-type voltage regulator coupled between the first and second power supply terminals, wherein the N-type voltage regulator controls a first voltage level at the second power supply terminal; and a P-type voltage regulator coupled between the third and fourth power supply terminals, wherein the P-type voltage regulator controls a second voltage level at the third power supply terminal. The N-type voltage regulator may further comprise an N-channel transistor having a first current electrode coupled to the second power supply terminal, a control electrode, and a second current electrode coupled to the third power supply terminal, and wherein the P-type voltage regulator may further comprise a P-channel transistor having a first current electrode coupled to the second power supply terminal, a control electrode, and a second current electrode coupled to the third power supply terminal. The N-type voltage regulator may further comprise: a voltage divider having a first terminal coupled to the first power supply terminal, a second terminal, and a third terminal coupled to the first current electrode of the N-channel transistor; and an amplifier having a first input terminal coupled to the second terminal of the voltage divider, a second input terminal for receiving a first reference voltage, and an output terminal coupled to the control electrode of the N-channel transistor. The P-type voltage regulator may comprise: a voltage divider having a first terminal coupled to the fourth power supply terminal, a second terminal, and a third terminal coupled to the second current electrode of the P-channel transistor; and an amplifier having a first input terminal coupled to the second terminal of the voltage divider, a second input terminal for receiving a second reference voltage, and an output terminal coupled to the control electrode of the P-channel transistor. The integrated circuit may further comprise: a first stability compensation circuit having a first terminal coupled to the control electrode of the N-channel transistor, and a second terminal coupled to the fourth power supply terminal; and a second stability compensation circuit having a first terminal coupled to the control electrode of the P-channel transistor, and a second terminal coupled to the fourth power supply terminal. The integrated circuit may further comprise: a first stability compensation circuit coupled between the first power supply terminal and the second power supply terminal; and a second stability compensation circuit coupled between the third power supply terminal and the fourth power supply terminal.

In yet another embodiment, there is provided, an integrated circuit comprising: a first power domain comprising first electrical circuitry, the first electrical circuitry coupled to a first power supply terminal and a second power supply terminal; a second power domain comprising second electrical circuitry, the second electrical circuitry coupled to a third power supply terminal and a fourth power supply terminal; an N-type voltage regulator comprising: an N-channel transistor having a first current electrode coupled to the second power supply terminal, a control electrode, and a second current electrode coupled to the third power supply terminal; a first voltage divider having a first terminal coupled to the first power supply terminal, a second terminal, and a third terminal coupled to the first current electrode of the N-channel transistor; and a first amplifier having a first input terminal coupled to the second terminal of the first voltage divider, a second input terminal for receiving a first reference voltage, and an output terminal coupled to the control electrode of the N-channel transistor; and a P-type voltage regulator comprising: a P-channel transistor having a first current electrode coupled to the second power supply terminal, a control electrode, and a second current electrode coupled to the third power supply terminal; a second voltage divider having a first terminal coupled to the fourth power supply terminal, a second terminal, and a third terminal coupled to the second current electrode of the P-channel transistor; and a second amplifier having a first input terminal coupled to the second terminal of the second voltage divider, a second input terminal for receiving a second reference voltage, and an output terminal coupled to the control electrode of the P-channel transistor. The integrated circuit may further comprise: a first stability compensation circuit having a first terminal coupled to the control electrode of the N-channel transistor, and a second terminal coupled to the fourth power supply terminal; and a second stability compensation circuit having a first terminal coupled to the control electrode of the P-channel transistor, and a second terminal coupled to the fourth power supply terminal. The first and second stability compensation circuits may each comprise: at least one capacitor; and at least one switch for selectively coupling the at least one capacitor between corresponding ones of the first and second power supply nodes and the third and fourth power supply nodes. The integrated circuit may further comprise: a first stability compensation circuit coupled between the first power supply terminal and the second power supply terminal; and a second stability compensation circuit coupled between the third power supply terminal and the fourth power supply terminal. The first and second stability compensation circuits may each comprise: at least one capacitor; and at least one switch for selectively coupling the at least one capacitor between corresponding ones of the first and second power supply nodes and the third and fourth power supply nodes.

Figure 2:
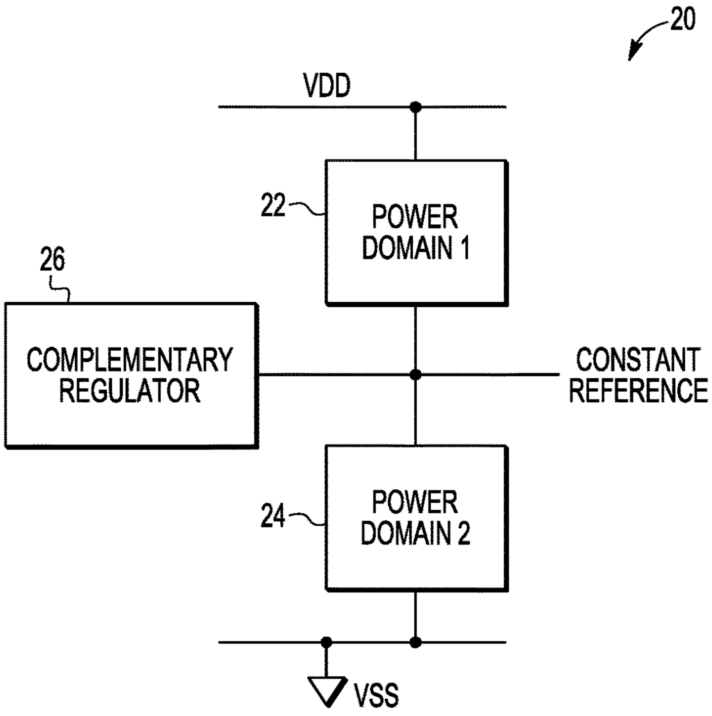
FIG. 2 illustrates, in block diagram form, an integrated circuit in accordance with an embodiment.

FIG. 2 illustrates, in block diagram form, an integrated circuit 20 in accordance with an embodiment. Integrated circuit 20 includes power domains 22 and 24, and complementary voltage regulator 26. Power domains 22 and 24 both include electrical circuitry. The electrical circuitry can be any type of electrical circuitry including analog or digital or both analog and digital. The electrical circuitry can include logic circuits or any type of memory circuits, either volatile or non-volatile. The electrical circuitry can include any transistor type, for example, bipolar or complementary metal-oxide semiconductor (CMOS) or any combination of transistor types. Power domain 22 has a first power supply voltage terminal connected to receive a power supply voltage labeled VDD, and a second power supply voltage terminal connected to receive a mid-level voltage from complementary voltage regulator 26 labeled "CONSTANT REFERENCE." In one embodiment, the mid-level voltage is between VDD and ground. Power domain 24 has a third power supply voltage terminal connected to receive the mid-level voltage CONSTANT REFERENCE from complementary voltage regulator 26, and a power supply voltage terminal connected to ground.

The mid-level voltage CONSTANT REFERENCE functions as a local ground for power domain 22 and the power supply voltage for power domain 24. The consumed current through different power domains are shared, or reused, to provide enhanced power efficiency for integrated circuit 20. More than two levels of power domains can be provided. Complementary voltage regulator 26 includes an N-type regulator and a P-type regulator. The complementary voltage regulator will be described in more detail below.

Figure 3:
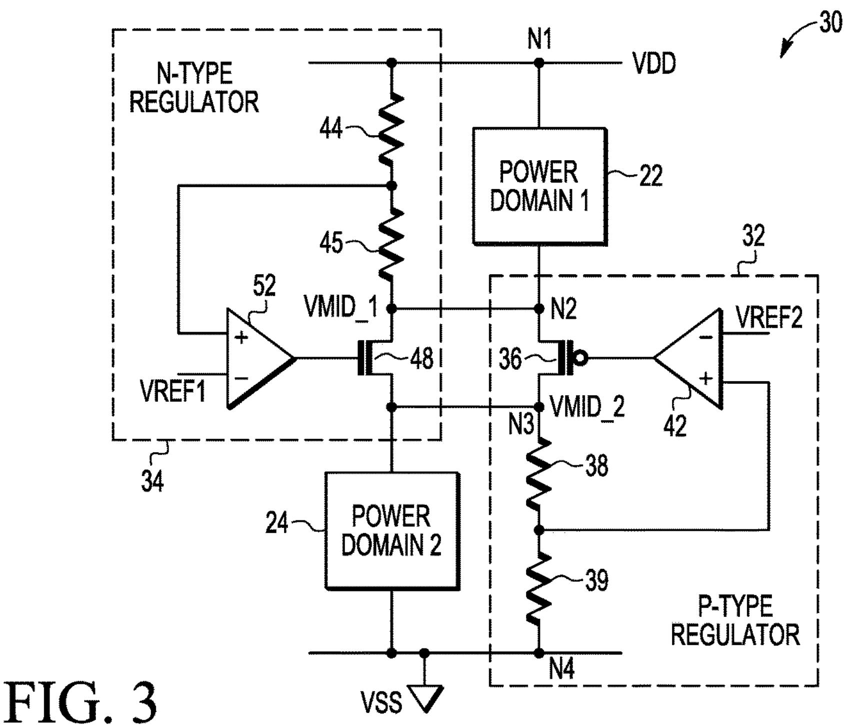
FIG. 3 illustrates, in partial block diagram form and partial schematic diagram form, an integrated circuit in accordance with an embodiment.

FIG. 3 illustrates, in partial block diagram form and partial schematic diagram form, an integrated circuit 30 in accordance with an embodiment. Integrated circuit 30 includes power domains 22 and 24, P-type regulator 32, and N-type regulator 34. P-type regulator includes P-channel transistor 36, resistors 38 and 39, and amplifier 42. Note that in other embodiments, there may be more than two power domains. As described above, power domains 22 and 24 include electrical circuitry.

In integrated circuit 30, power domain 22 has a first power supply voltage terminal connected to receive power supply voltage VDD at a node n1, and a second power supply voltage terminal connected to receive mid-level voltage labeled VMID_1 at node n2. Power domain 24 has a third power supply voltage terminal connected to receive a mid-level voltage labeled VMID_2 at node n3, and a fourth power supply voltage terminal connected to power supply voltage terminal VSS at node n4. In the illustrated embodiment, VSS is ground.

In P-type regulator 32, P-channel transistor 36 has a source (current electrode) connected to the second power supply voltage terminal of power domain 22 at node n2, a gate (control electrode), and a drain (current electrode) connected to the third power supply voltage terminal at node n3. Resistors 38 and 39 form a voltage divider. Resistor 38 has a first terminal connected to the drain of P-channel transistor 36 at node n3, and a second terminal. Resistor 39 has a first terminal connected to the second terminal of resistor 38, and a second terminal connected to power supply voltage terminal VSS at node n4. Amplifier 42 has a first input terminal connected to the second terminal of resistor 38, a second input terminal connected to receive a reference voltage labeled VREF2, and an output terminal connected to the gate of P-channel transistor 36.

In N-type regulator 34, N-channel transistor 48 has a drain connected to the source of P-channel transistor 36 at node n2, a gate, and a source connected to the drain of P-channel transistor 36 at node n3. Resistors 44 and 45 form a voltage divider. Resistor 44 has a first terminal connected to VDD at node n1, and a second terminal. Resistor 45 has a first terminal connected to the second terminal of resistor 44, and a second terminal connected to the drain of N-channel transistor 48 at node n2. Amplifier 52 has a first input terminal connected to the second terminal of resistor 44, a second input terminal connected to receive a reference voltage labeled VREF1, and an output terminal connected to the gate of N-channel transistor 48.

In operation, P-type regulator provides a relatively constant mid-level voltage VMID_2 at node n3 as determined by the voltage of reference voltage VREF2. Amplifier 42 functions to regulate the gate voltage of P-channel transistor 36 by comparing the voltage between resistors 38 and 39 to reference voltage VREF2 and adjusting the amplifier output voltage accordingly so that VMID_2 is the desired voltage to supply power domain 24 with a power supply voltage and to function as the local "ground" for N-type regulator 34. The voltage VMID_2 is $$\mathrm{Vmid\_2} = Vref2 \cdot \frac{(R_{38} + R_{39})}{R_{39}}$$

where R38 and R39 are resistance values of resistors 38 and 39, respectively. In the illustrated embodiment, voltage VMID_2 is between VDD and VSS, where VDD is a positive voltage and VSS is ground. In other embodiments, the voltages may be different. Likewise, N-type regulator 34 functions in a similar manner to provide the local supply of P-type regulator 32 and the local "ground" of the circuits in power domain 22. In N-type regulator 34

$$\mathrm{Vmid\_1} = (Vdd - Vref1) \cdot \frac{(R_{44} + R_{45})}{R_{44}}$$

where R44 and R45 are the resistance values of resistors 44 and 45, respectively. Using P-type regulator 32 and N-type regulator 34, consumed current through power domain 22 is provided to supply power domain 24, thus providing for more efficient use of the power supply.

Figure 4:
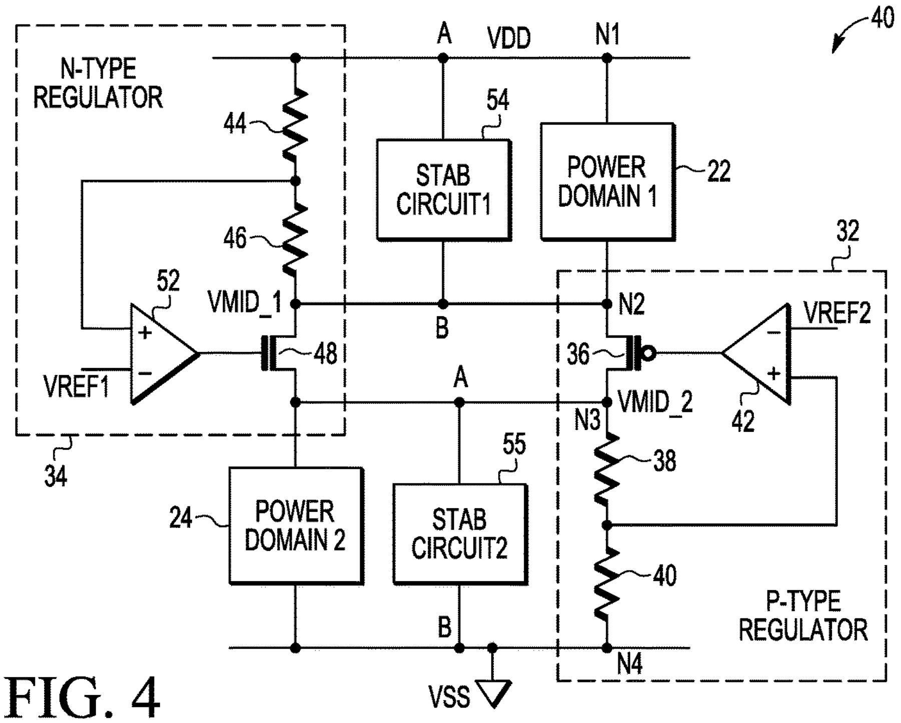
FIG. 4 illustrates, in partial block diagram form and partial schematic diagram form, an integrated circuit in accordance with another embodiment.

FIG. 4 illustrates, in partial block diagram form and partial schematic diagram form, integrated circuit 40 in accordance with another embodiment. Integrated circuit 40 is the same as integrated circuit 30 of FIG. 3, except that integrated circuit 40 includes stability compensation circuits 54 and 55. Stability compensation circuit 54 has a first terminal A connected to VDD at node n1, and a second terminal B connected to node n2. Stability compensation circuit 55 has a first terminal A connected to node n3, and a second terminal B connected to VSS at node n4. Stability compensation circuits 54 and 55 are employed to ensure the required stability of the feedback scheme in P-type regulator 32 and N-type regulator 34. One example of a stability compensation circuit is illustrated in FIG. 6 and will be described later.

Figure 5:
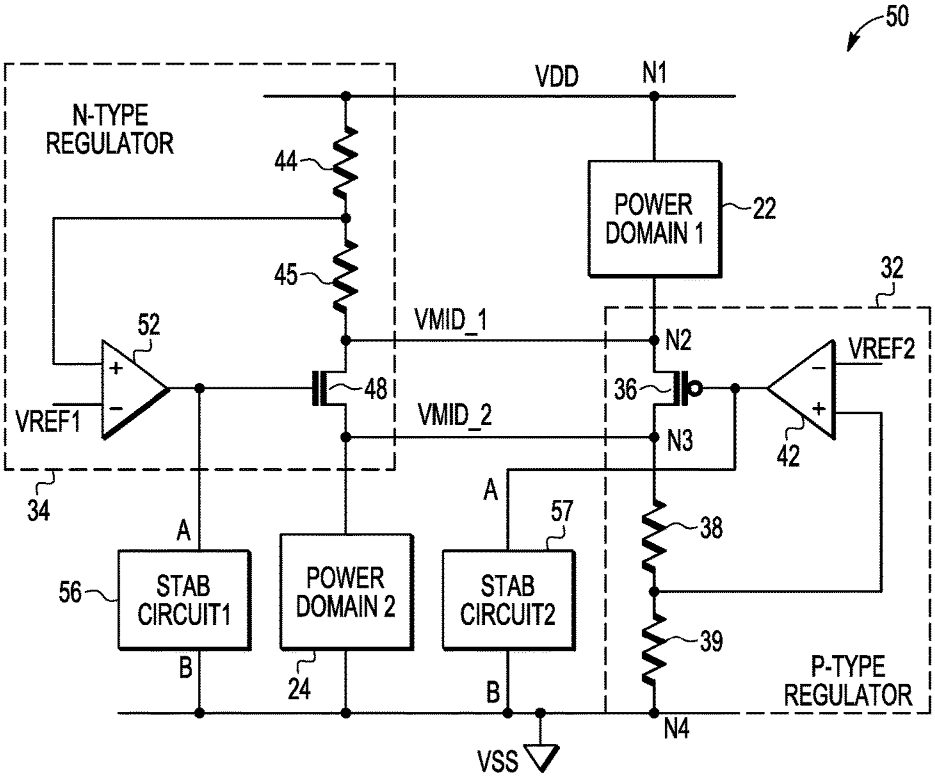
FIG. 5 illustrates, in partial block diagram form and partial schematic diagram form, an integrated circuit in accordance with another embodiment.

FIG. 5 illustrates, in partial block diagram form and partial schematic diagram form, integrated circuit 50 in accordance with another embodiment. Integrated circuit 50 is the same as integrated circuit 30 in FIG. 3, except that integrated circuit 50 includes stability compensation circuits 56 and 57. Stability compensation circuit 56 has a first terminal A connected to the output terminal of amplifier 52, and a second terminal B connected to VSS at node n4. Stability compensation circuit 57 has a first terminal A connected to the output terminal of amplifier 42, and a second terminal B connected to VSS at node n4. Stability compensation circuits 56 and 57 are provided as another embodiment to ensure the required stability of the feedback scheme in P-type regulator 32 and N-type regulator 34.

Figure 6:
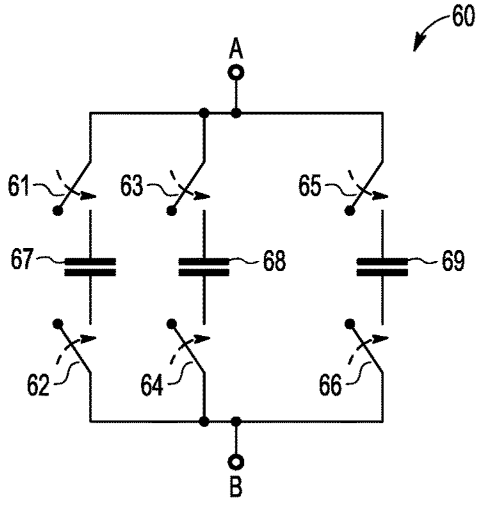
FIG. 6 illustrates, in schematic diagram form, an embodiment of a stability compensating circuit for use in the integrated circuits of FIGS. 4 and 5.

FIG. 6 illustrates, in schematic diagram form, stability compensation circuit 60 for use in the integrated circuits of FIGS. 4 and 5. Stability compensation circuit 60 includes switches 61-66 and capacitors 67-69. Switches 61 and 62 connect capacitor 67 between terminals A and B when switches 61 and 62 are closed. Switches 63 and 64 connect capacitor 68 between terminals A and B when switches 63 and 64 are closed. Switches 65 and 66 connect capacitor 69 between terminals A and B when switches 65 and 66 are closed. Any number of capacitors can be provided in circuit 60 and any number can be connected between terminals A and B depending on the circuit requirements. Also, the capacitors 67, 68, and 69 can have the same or different values. A control circuit (not shown) is used to provide a control signal to the switches.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit comprising:

first and second power domains each comprising at least one electrical circuit, and wherein the first power domain is coupled between first and second power supply nodes and the second power domain is coupled between third and fourth power supply nodes;

an N-type voltage regulator coupled between the first and third power supply nodes, wherein the N-type voltage regulator controls a first voltage level at the second power supply node; and a P-type voltage regulator coupled between the second and fourth power supply nodes, wherein the P-type voltage regulator controls a second voltage level at the third power supply node.

2. The integrated circuit of claim 1, wherein the first power supply node receives a power supply voltage and the fourth power supply node is coupled to ground.

3. The integrated circuit of claim 1, further comprising:

an N-channel transistor having a first current electrode coupled to the second power supply node, a control electrode, and a second current electrode coupled to the third power supply node; and a P-channel transistor having a first current electrode coupled to the second power supply node, a control electrode, and a second current electrode coupled to the third power supply node.

4. The integrated circuit of claim 3, wherein the N-type voltage regulator comprises:

a voltage divider having a first terminal coupled to the first power supply voltage node, a second terminal, and a third terminal coupled to the first current electrode of the N-channel transistor; and an amplifier having a first input terminal coupled to the second terminal of the voltage divider, a second input terminal for receiving a first reference voltage, and an output terminal coupled to the control electrode of the N-channel transistor.

5. The integrated circuit of claim 3, wherein the P-type voltage regulator comprises:

a voltage divider having a first terminal coupled to the fourth power supply node, a second terminal, and a third terminal coupled to the second current electrode of the P-channel transistor; and an amplifier having a first input terminal coupled to the second terminal of the voltage divider, a second input terminal for receiving a second reference voltage, and an output terminal coupled to the control electrode of the P-channel transistor.

6. The integrated circuit claim 3, further comprising:

a first stability compensation circuit having a first terminal coupled to the control electrode of the N-channel transistor, and a second terminal coupled to the fourth power supply node; and a second stability compensation circuit having a first terminal coupled to the control electrode of the P-channel transistor, and a second terminal coupled to the fourth power supply node.

7. The integrated circuit of claim 1 further comprising:

a first stability compensation circuit coupled between the first power supply node and the second power supply node; and a second stability compensation circuit coupled between the third power supply node and the fourth power supply node.

8. The integrated circuit of claim 7, wherein the first stability compensation circuit comprises a first capacitor selectively coupled between to the first and second power supply nodes and wherein the second stability compensation circuit comprises a second capacitor selectively coupled between to the third and fourth power supply nodes.

9. The integrated circuit of claim 7, wherein the first and second stability compensation circuits each comprise:

at least one capacitor; and at least one switch for selectively coupling the at least one capacitor between corresponding ones of the first and second power supply nodes and the third and fourth power supply nodes.

10. An integrated circuit comprising:

a first power domain comprising first electrical circuitry, the first electrical circuitry coupled to a first power supply terminal and a second power supply terminal;

a second power domain comprising second electrical circuitry, the second electrical circuitry coupled to a third power supply terminal and a fourth power supply terminal;

an N-type voltage regulator coupled between the first and third power supply terminals, wherein the N-type voltage regulator controls a first voltage level at the second power supply terminal; and a P-type voltage regulator coupled between the second and fourth power supply terminals, wherein the P-type voltage regulator controls a second voltage level at the third power supply terminal.

11. The integrated circuit of claim 10, wherein the N-type voltage regulator further comprises an N-channel transistor having a first current electrode coupled to the second power supply terminal, a control electrode, and a second current electrode coupled to the third power supply terminal, and wherein the P-type voltage regulator further comprises a P-channel transistor having a first current electrode coupled to the second power supply terminal, a control electrode, and a second current electrode coupled to the third power supply terminal.

12. The integrated circuit of claim 11, wherein the N-type voltage regulator further comprises:

a voltage divider having a first terminal coupled to the first power supply terminal, a second terminal, and a third terminal coupled to the first current electrode of the N-channel transistor; and an amplifier having a first input terminal coupled to the second terminal of the voltage divider, a second input terminal for receiving a first reference voltage, and an output terminal coupled to the control electrode of the N-channel transistor.

13. The integrated circuit of claim 11, wherein the P-type voltage regulator comprises:

a voltage divider having a first terminal coupled to the fourth power supply terminal, a second terminal, and a third terminal coupled to the second current electrode of the P-channel transistor; and an amplifier having a first input terminal coupled to the second terminal of the voltage divider, a second input terminal for receiving a second reference voltage, and an output terminal coupled to the control electrode of the P-channel transistor.

14. The integrated circuit claim 11, further comprising:

a first stability compensation circuit having a first terminal coupled to the control electrode of the N-channel transistor, and a second terminal coupled to the fourth power supply terminal; and a second stability compensation circuit having a first terminal coupled to the control electrode of the P-channel transistor, and a second terminal coupled to the fourth power supply terminal.

15. The integrated circuit of claim 10 further comprising:

a first stability compensation circuit coupled between the first power supply terminal and the second power supply terminal; and a second stability compensation circuit coupled between the third power supply terminal and the fourth power supply terminal.

16. An integrated circuit comprising:

a first power domain comprising first electrical circuitry, the first electrical circuitry coupled to a first power supply terminal and a second power supply terminal;

a second power domain comprising second electrical circuitry, the second electrical circuitry coupled to a third power supply terminal and a fourth power supply terminal;

an N-type voltage regulator comprising:

an N-channel transistor having a first current electrode coupled to the second power supply terminal, a control electrode, and a second current electrode coupled to the third power supply terminal;

a first voltage divider having a first terminal coupled to the first power supply terminal, a second terminal, and a third terminal coupled to the first current electrode of the N-channel transistor; and a first amplifier having a first input terminal coupled to the second terminal of the first voltage divider, a second input terminal for receiving a first reference voltage, and an output terminal coupled to the control electrode of the N-channel transistor; and a P-type voltage regulator comprising:

a P-channel transistor having a first current electrode coupled to the second power supply terminal, a control electrode, and a second current electrode coupled to the third power supply terminal;

a second voltage divider having a first terminal coupled to the fourth power supply terminal, a second terminal, and a third terminal coupled to the second current electrode of the P-channel transistor; and a second amplifier having a first input terminal coupled to the second terminal of the second voltage divider, a second input terminal for receiving a second reference voltage, and an output terminal coupled to the control electrode of the P-channel transistor.

17. The integrated circuit claim 16, further comprising:

a first stability compensation circuit having a first terminal coupled to the control electrode of the N-channel transistor, and a second terminal coupled to the fourth power supply terminal; and a second stability compensation circuit having a first terminal coupled to the control electrode of the P-channel transistor, and a second terminal coupled to the fourth power supply terminal.

18. The integrated circuit of claim 17, wherein the first and second stability compensation circuits each comprise:

at least one capacitor; and at least one switch for selectively coupling the at least one capacitor between corresponding ones of the control electrode of the N-channel transistor and the fourth power supply node and the control electrode of the P-channel transistor and fourth power supply node.

19. The integrated circuit of claim 16 further comprising:

a first stability compensation circuit coupled between the first power supply terminal and the second power supply terminal; and a second stability compensation circuit coupled between the third power supply terminal and the fourth power supply terminal.

20. The integrated circuit of claim 19, wherein the first and second stability compensation circuits each comprise:

at least one capacitor; and at least one switch for selectively coupling the at least one capacitor between corresponding ones of the first and second power supply nodes and the third and fourth power supply nodes.

* * * * *